US010655494B2

(12) United States Patent
Amari et al.

(10) Patent No.: US 10,655,494 B2
(45) Date of Patent: May 19, 2020

(54) MODEL PREDICTIVE CONTROL SUB-SYSTEM POWER MANAGEMENT

(71) Applicant: United Technologies Corporation, Farmington, CT (US)

(72) Inventors: Martin Richard Amari, Glastonbury, CT (US); Joshua Adams, New Hartford, CT (US); Manuj Dhingra, Glastonbury, CT (US); Timothy J. Crowley, Tolland, CT (US); Coy Bruce Wood, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 36 days.

(21) Appl. No.: 16/163,277

(22) Filed: Oct. 17, 2018

(65) Prior Publication Data

US 2020/0123926 A1 Apr. 23, 2020

(51) Int. Cl.
*F01D 25/00* (2006.01)
*G05B 13/04* (2006.01)

(52) U.S. Cl.
CPC ........... *F01D 25/00* (2013.01); *G05B 13/041* (2013.01); *F05D 2220/323* (2013.01); *F05D 2260/80* (2013.01); *F05D 2260/81* (2013.01); *F05D 2270/20* (2013.01); *F05D 2270/301* (2013.01); *F05D 2270/303* (2013.01); *F05D 2270/44* (2013.01); *F05D 2270/66* (2013.01); *F05D 2270/70* (2013.01)

(58) Field of Classification Search
CPC ................ F01D 25/00; F05D 2260/80; F05D 2220/323; G05B 13/041
See application file for complete search history.

(56) References Cited

U.S. PATENT DOCUMENTS

| 6,823,253 | B2 | 11/2004 | Brunell |
| 6,823,675 | B2 | 11/2004 | Brunell et al. |
| 9,002,615 | B2 | 4/2015 | Kumar et al. |
| 9,334,815 | B2 | 5/2016 | Cygan, Jr. et al. |
| 2003/0089113 | A1* | 5/2003 | Simunek ................. F01D 17/02 60/773 |
| 2004/0102890 | A1* | 5/2004 | Brunell ................ G05B 13/048 701/100 |

(Continued)

*Primary Examiner* — Vincent H Tran
(74) *Attorney, Agent, or Firm* — Cantor Colburn LLP

(57) ABSTRACT

A system for controlling a plurality of electromechanical effectors operably connected to an engine to control engine parameters. The system also includes a plurality of sensors operably connected to measure a state or parameter of each effector, a power supply configured to supply power to the plurality of effectors, and a controller operably connected to the plurality of sensors, the plurality of effectors, and the power supply. The controller executes a method for an adaptive model-based control for controlling each effector, The method includes receiving a request indicative of a desired state for each effector, receiving a weighting associated each request, obtaining information about a current state of each effector, and updating an adaptive model based control (MBC) based upon the information. The method also includes generating a control command for an effector based upon the adaptive MBC and commanding the effector based upon the control command.

22 Claims, 5 Drawing Sheets

(56) References Cited

U.S. PATENT DOCUMENTS

| | | | |
|---|---|---|---|
| 2012/0095612 A1* | 4/2012 | Rivers, Jr. | H02J 3/14 |
| | | | 700/297 |
| 2013/0184961 A1* | 7/2013 | Kumar | F02C 9/28 |
| | | | 701/100 |
| 2016/0247065 A1* | 8/2016 | Nasle | G06N 20/00 |
| 2018/0119629 A1* | 5/2018 | Cline | G05B 13/041 |
| 2018/0202380 A1 | 7/2018 | Wang et al. | |

* cited by examiner

MODEL PREDICTIVE CONTROL SUB-SYSTEM POWER MANAGEMENT

BACKGROUND

This disclosure relates to system control design, and more particularly to model based predictive control and power management for mechanical systems.

Complex engineered systems including such things as vehicles, gas turbine engines, heating, ventilating, and air conditioning (HVAC) systems are coupled dynamic systems where response of one component may interact unfavorably with another component within the same system. This interaction can be managed via two complementary approaches: control methods that actively manage the interaction between multiple components (or sub-systems) of a subsystem and, excess design margins that ensure system-level metrics are achievable in the presence of unfavorable interactions. Advanced control design techniques can be useful in reducing excessive design margins (over-design) to either increase system performance or reduce its cost.

In electronic actuations systems used to manipulate mechanical systems such as variable geometry of a gas turbine engine, HVAC systems, and elevator systems, it becomes important to manage the amount of power being drawn at any given time such that power supplies and power delivery system are not over drawn. In order to handle this, either the power system must be sized to handle the worst case power draw of all system drawing at one time or the sub-systems have to be managed together, preventing the sum of the draw from exceeding limits. Since an engine is a highly coupled system, stopping or slowing one sub-system while another is allowed to move at full rate can be problematic therefore coordinated management is required.

BRIEF DESCRIPTION

According to an embodiment, described herein is a method for controlling a plurality of electromechanical effectors of a gas turbine engine system. The method includes receiving a request indicative of a desired state for each effector of the plurality of effectors, receiving a weighting associated with each request, and obtaining information about a current state and at least one previous state of each effector of the plurality of effectors; wherein the current state includes at least one of an effector position and an effector current draw. The method also includes updating model data information in an adaptive model based control (MBC) based upon the obtained information, generating at least one control command for at least one effector of the plurality of effectors based upon the adaptive model based control, and commanding the at least one effector of the plurality of effectors based upon the generated at least one control command.

In addition to one or more of the features described above, or as an alternative to any of the foregoing embodiments, further embodiments may include determining at least one of a constraint, an objective, an operational parameter or characteristic, a weighting, and an initial condition, for the adaptive model-based control system.

In addition to one or more of the features described above, or as an alternative to any of the foregoing embodiments, further embodiments may include adapting the adaptive model based control system based on the at least one of the constraint, the objective, the initial condition, and the model characteristic.

In addition to one or more of the features described above, or as an alternative to any of the foregoing embodiments, further embodiments may include that the adapting comprises modifying the model, constraints, and control parameters using information obtained about the current state of the effector.

In addition to one or more of the features described above, or as an alternative to any of the foregoing embodiments, further embodiments may include obtaining information about the current state and previous state of the effector comprises obtaining information about at least one of: an effector position, an effector speed, an effector current, a sensor, a sensing system, and a total current or power for the plurality of effectors.

In addition to one or more of the features described above, or as an alternative to any of the foregoing embodiments, further embodiments may include that the generating step comprises identifying at least one reduced current requirement for the at least one effector of the plurality of effectors.

In addition to one or more of the features described above, or as an alternative to any of the foregoing embodiments, further embodiments may include a total current required for the plurality of effectors based on the at least one reduced current requirement is less than a selected threshold.

In addition to one or more of the features described above, or as an alternative to any of the foregoing embodiments, further embodiments may include that the selected threshold is less than a cumulative current requirement for the plurality of effectors without the at least one reduced current requirement.

In addition to one or more of the features described above, or as an alternative to any of the foregoing embodiments, further embodiments may include the generating step comprises utilizing an quadratic programming optimizing method to determine the control command given the current state of the effector, the objective function, and the constraints and the weightings.

In addition to one or more of the features described above, or as an alternative to any of the foregoing embodiments, further embodiments may include the effector is an electromechanical actuator driven from a power supply, the power supply having a current rating lower than the cumulative current ratings of the effectors.

In addition to one or more of the features described above, or as an alternative to any of the foregoing embodiments, further embodiments may include the electromechanical actuator includes a motor and a motor controller.

Also described herein in another embodiment is an adaptable model-based control system for controlling a plurality of electromechanical effectors of gas turbine engine. The system includes a plurality of sensors operably connected to measure a state or parameter of each effector of the plurality of effectors, the plurality of effectors operably connected to the engine to control a plurality of engine parameters, a power supply configured to supply power to the plurality of effectors, and a controller operably connected to the plurality of sensors, the plurality of effectors, and the power supply, the controller configured to execute a method for an adaptive model-based control for controlling each effector. The method includes receiving a request indicative of a desired state for each effector of the plurality of effectors, receiving a weighting associated with each request, and obtaining information about a current state and previous states of each effector of the plurality of effectors. The current state includes at least one of an effector position and an effector current draw. The method also includes updating model data information in an adaptive model based control (MBC)

based upon the obtained information, generating at least one control command for at least one effector of the plurality of effectors based upon the adaptive model based control, and commanding the at least one effector of the plurality of effectors based upon the generated at least one control command.

In addition to one or more of the features described above, or as an alternative to any of the foregoing embodiments, further embodiments may include the controller determining at least one of a constraint, an objective, an operational parameter or characteristic, a weighting, and an initial condition, for the adaptive model-based control system.

In addition to one or more of the features described above, or as an alternative to any of the foregoing embodiments, further embodiments may include the controller adapting the model based control system based on the at least one of the constraint, the objective, the initial condition, and the model characteristic, wherein the adapting comprises modifying the model, constraints, and control parameters using information obtained about the current state of the effector.

In addition to one or more of the features described above, or as an alternative to any of the foregoing embodiments, further embodiments may include that the obtaining information about the current state and previous state of the effector comprises obtaining information about at least one of: an effector position, an effector speed, an effector current, a sensor, a sensing system, and a total current or total power for the plurality of effectors.

In addition to one or more of the features described above, or as an alternative to any of the foregoing embodiments, further embodiments may include that the updating step comprises updating at least one of: a state, a variable, a parameter, a constraint, an objective function, and an initial condition.

In addition to one or more of the features described above, or as an alternative to any of the foregoing embodiments, further embodiments may include that the generating step comprises identifying at least one reduced current requirement for the at least one effector of the plurality of effectors.

In addition to one or more of the features described above, or as an alternative to any of the foregoing embodiments, further embodiments may include a total current required for the plurality of effectors based on the at least one reduced current requirement is less than a selected threshold.

In addition to one or more of the features described above, or as an alternative to any of the foregoing embodiments, further embodiments may include that the selected threshold is less than a cumulative current requirement for the plurality of effectors without the at least one reduced current requirement.

In addition to one or more of the features described above, or as an alternative to any of the foregoing embodiments, further embodiments may include that the generating step comprises utilizing a quadratic programming optimizing method to determine the control command given the current state of the effector, the objective function, and the constraints and the weightings.

In addition to one or more of the features described above, or as an alternative to any of the foregoing embodiments, further embodiments may include that the effector is an electromechanical actuator driven from a power supply, the power supply having a current rating lower than the cumulative current ratings of the effectors.

In addition to one or more of the features described above, or as an alternative to any of the foregoing embodiments, further embodiments may include the electromechanical actuator includes a motor and a motor controller.

Technical effects of the embodiments described include, but are not limited to fault prediction, interactive monitoring, and power efficiency of mechanical systems, in particular actuation systems.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
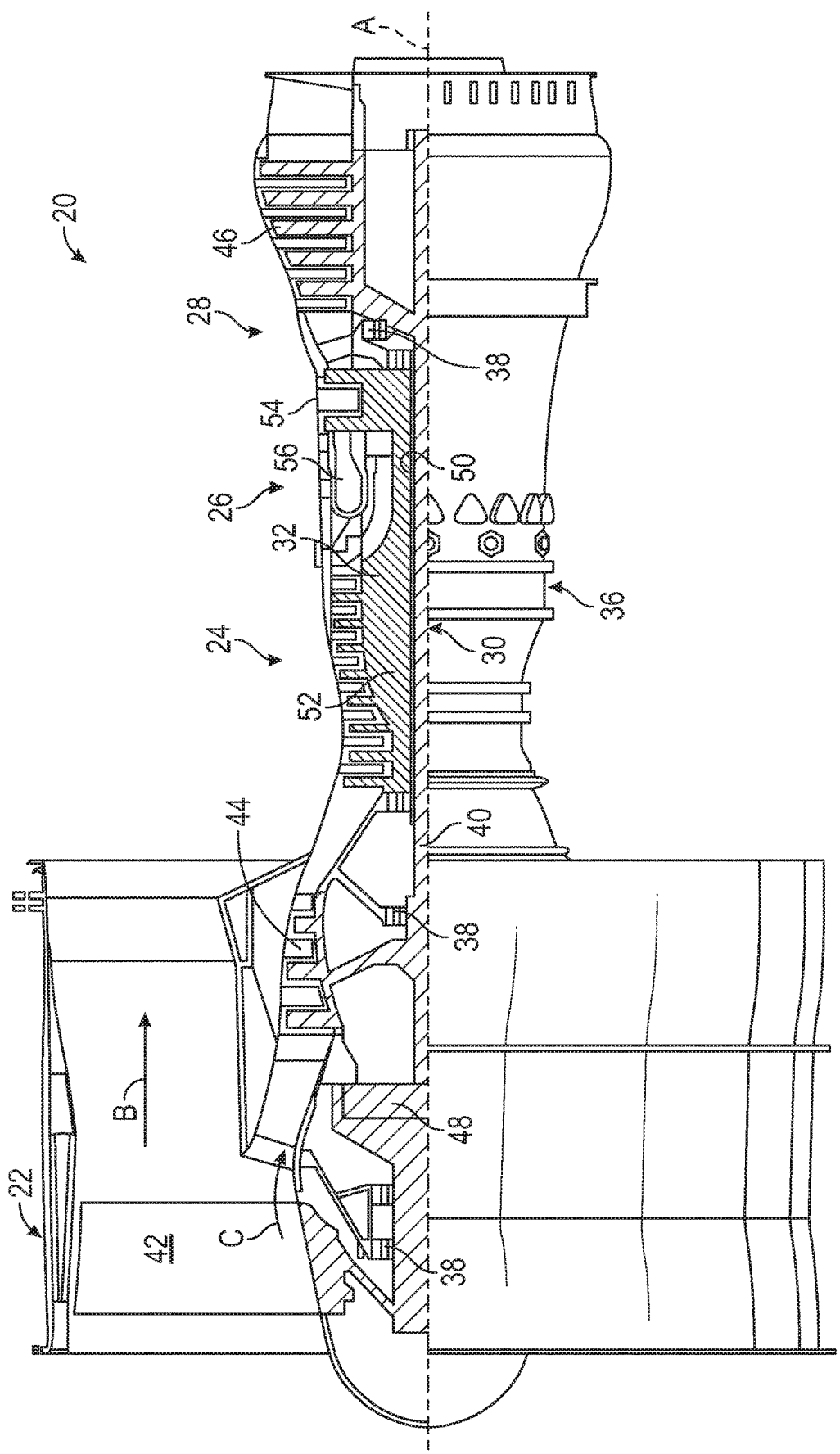
FIG. 1 depicts a simplified partial cutaway of a gas turbine engine as employed in the embodiments.

Embodiments develop and utilize a decoupled design approach to component design and its control, where each component (such as a motor) is over-sized or a common component is sized for worst case (such as the power-supply) to accommodate unfavorable component interactions. Each component is then individually controlled, neglecting the interactions with other components in the system. Further, each control design may utilize any one of the classical control design methods or more recent techniques that utilize predictions from a model.

Described herein in one or more embodiments is a method and system to use model predictive control to manage the engine sub-systems limiting the overall current draw at any given time to a level that is acceptable to the power system. Weightings can be given to the sub-systems based on the importance of the systems for a given maneuver or change in operating condition. The weights can vary as needed to account for different modes of gas turbine engine operation. For example, one set of weighting may be required for an engine start, while a max power acceleration may employ a different set. The control may be implemented utilizing a number of model predictive algorithms, including but not limited to model predictive control, (MPC), or constrained model based control (CMBC). Also, in an embodiment, the control scheme utilizes real time linearization of the sub-systems in order to deal with non-linear behaviors of the system. Advantageously, the overall size of a system may be reduced utilizing smart management of power. Employing the described embodiments facilitates reductions in size and ratings of the power supply and conductors. Reduced current requirements and system control prevents the sub-systems to run to max rate or load and any given time. As a result, packaging is reduced, engine size and weight are reduced, and waste energy and waste heating is reduced.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration". Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
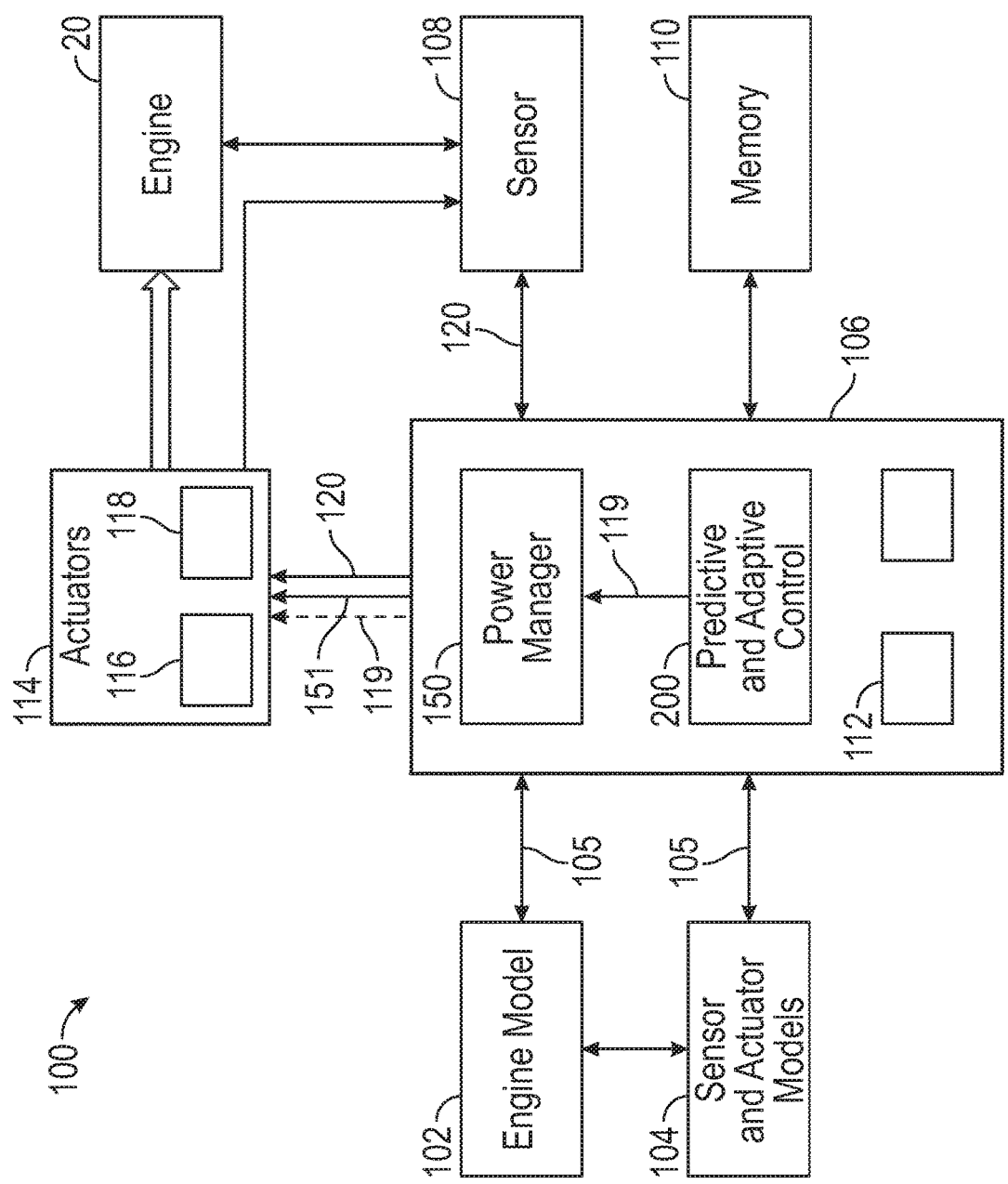
FIG. 2 is a simplified block diagram of an engine control system in accordance with an embodiment.

FIG. 2 illustrates an exemplary embodiment of an engine control system 100 as may be employed with engine 20. It should be appreciated that while the engine control system 100 as depicted and described herein may be a model based control system, other configurations and architectures are possible. As shown in FIG. 2, system 100 includes engine 20, an actuator 114 and a sensor 108 that is communicatively coupled with a processor or controller 106. Sensor 108 is any of a variety of sensor employed in the engine including temperature, pressure, flow, speed and position sensors, and the like. In this embodiment, and for the purposes of description of the embodiments herein the sensor 108 is a position sensor associated with one or more of the actuators abut other types of sensors (e.g., flow meters and speed sensors) also could be used.

The processor 106 is communicatively coupled to the actuator 114 to provide commands to control the engine 20. In an embodiment once instance of the actuator 114 may include a motor drive 116 and motor 118 as may be employed with an electromechanical actuator. In some embodiments the actuator 114 could include solenoids, servovalves, hydraulic actuators, and the like. In addition the processor 106 is operatively coupled to a memory 110, sensor and actuator models 104, and an engine model 102. The sensor and actuator models 104 are associated with any of the sensor(s) 108 and actuators 114, and, in this embodiment, are communicatively coupled with the engine model 102. Alternatively, functionality associated with a sensor and actuator models 104 may be an integrated with an engine model 102 in other embodiments. Further, in other embodiments, engine model 102 and/or sensor and actuator model 104 may be integrated into various components such as, for example, into a Full Authority Digital Engine Control (FADEC) system such as system 100. In an exemplary embodiment, the FADEC may be physically attached to the gas turbine engine 20.

In operation, the sensor 108 monitors an engine operating parameter, such as temperature, pressure, position, and the like, and provides data corresponding to the parameter to the controller 106, which may store the data in memory 110. For example, in an embodiment, the sensor 108 measures the position and/or speed of the actuator 114 to provide data to the controller 106 regarding the motion of the actuator 114. The processor 106 processes the data stored in the memory 110 and employs the data in various control algorithms, prognostics, diagnostics and the like. In some embodiments, the processor 106 compares from the sensor 108 to corresponding data of the sensor and actuator model 104. If the difference between the measured data of the sensor 108 and the reference data of the actuator model 104 is outside of a threshold value, the processor 106 may take various steps to address the difference including update the sensor and actuator model 104 with the data of the sensor 108, as discussed further herein. In an embodiment, by updating the reference data of the engine model 102 or actuator model 104, degradation of the components, which may occur over time, can be accommodated.

Monitoring engine parameter data provides the basis for performing gas turbine engine performance tracking. The dynamic behavior of measurement devices, particularly detecting and quantifying the changes in the dynamic responses of measurement devices, e.g., sensors 108, is useful in performing gas turbine engine performance tracking. By monitoring sensor data based on transient behavior, steady state behavior, and trend data, aspects of operation or even degradation of engine actuators 114 may be detected that may not be perceived when the engine is operating at steady state alone. Ascertaining and distinguishing performance trends may allow the predictive models 200, 150 or the engine model 102 and sensor and actuator model 104 to be updated in order to improve sensor 108 and actuator 114 operation, performance and further potentially compensate sensor 108 or actuator 114 degradation.

The described embodiments include adaptive model-based control systems 100 and adaptive control processes 200, 150 implementing the model based control. These systems 100 and methods 200, 150 may be employed to improve the performance of system components e.g., actuators 114 as well as to detect deterioration and/or degradation, faults, failures or damage to an engine 20, and/or components thereof including sensors 108 and actuators 114. Furthermore, the described embodiments facilitate incorporating such information into the various models, optimizations, objective functions, constraints and/or parameters in the control system 100 to allow the control system 100 to improve performance and/or operability as possible given the current engine 20 condition or the condition of a component thereof such as, but not limited to actuator 114. Current data regarding the dynamic characteristics of the sensors 108 and actuators 114 providing this information is useful in maintaining appropriate control. Particularly, it is desirable for sensor and actuator models 104 and predictive model 150 to model actuators 114 and accommodate limited power availability based on a smaller lower current capability power supply 130. This accommodation is accomplished by updating the model 150 in the model-based control system with information regarding the states of the actuators 114 as well as the status of the power supply 130 (e.g., current load for the actuators 114). The predictive engine models 200 and predictive actuator model 150 in the control system 100 may be adapted by using a filter, tracking filter, logic or other suitable method to modify states, variables, quality parameters, scalars, adders, constraints, limits or any other adaptable parameter so that the performance and limitations of the model match that of the engine 20 or actuator 114 after the parameter is changed. It should be appreciated the while for the purposes of discussion each of the models 200 and 150 as well as engine model 102 and sensor and actuator model 104 and the control system 100 are described separately and as separate entities, such description is merely for illustration. The models could be separated or integrated without distinction or deviation from the disclosure herein. For example, in one embodiment, the engine model, 102, and sensor and actuator model 104 may each be integral parts of the adaptive control method 200 or 150 of controller 106. Moreover, in some embodiments, the models may be integral with other components such as the actuator 114, or another controller employed in a particular embodiment.

Engine models 102 and sensor and actuator models 104 also provide the reference level for performing gas turbine engine performance tracking and anomaly detection to monitor engine 20 and engine sensor 108 and actuator 114 performance function, and even deterioration. Such tracking supports maintenance operations and logistics as well as alerting operators of potential failure conditions. This information reduces exposure to in-operation shutdowns and unscheduled maintenance or removals. It should be appreciated that not every eventuality is likely to be covered in the predictive models 200, 150 as employed, it is desirable for such models 200, 150 to reconfigure, adapt, and learn to make predictions or corrections based on various engine parameters, and conditions. In some embodiments, such adaptability for normal or deteriorated conditions comes from using an estimator or tracking filter to modify model inputs, outputs, or interior parameters as conditions change.

Such adaptability results from using diagnostics that can select between different models reference models for the engine 102, or sensors and actuators 104, modify model inputs, outputs, or interior parameters, or can modify the optimizations, objective functions, constraints, and/or parameters in the control system 100. Therefore, the embodiments described below allow for the trend data regarding the response of engine sensors and actuators 108, 114 to be determined. These trend data provide for the detection of component and specifically actuator anomalies that may not typically be detectable, yet aid in the prediction of degradation or failures. As a result, adjustment and/or correction of engine models 102 and sensor and actuator models 104 to compensate for degradation in one or more sensors 108 and actuators 114 is facilitated.

In embodiments described, any physical system, control system 100 or property of the engine 20 or engine subsystem may be modeled, including, but not limited to, the engine itself, the gas path and gas path dynamics; sensors 108, actuators 114, effectors, or other controlling devices that modify or change any engine behavior. The models 102, 104 of these components and/or systems may be physics-based models (including their linear approximations). Additionally or alternatively, the models may be based on linear and/or nonlinear system identification, neural networks, and/or combinations of all of these.

Gas turbine engines such as engine 20 due to the large range of operating conditions and power levels experienced during operation may require complex modeling techniques. Logically, turbine operation is restricted due to mechanical, aerodynamic, thermal and flow limitations. Moreover, advantageously Model Predictive Controls (MPC) are ideal for such environments because they can specifically address the nonlinearities, and both the input and output constraints of many variables, all in a single control formulation. Model predictive controls are full state feedback controls that use a model of the process/system/component to predict the output, up to a certain instant of time, based on the inputs to the system and the most recent process measurements. Model Inverting controls are full state feedback controls that use an inverted model of the process/system/component (engine, actuator, sensor, and the like) to formulate and generate reference commands based on actual measured conditions. Model Inverting control input values are calculated by inverting the dynamical equations that relate the actuator inputs to the desired outputs pertaining to various control objectives, given knowledge of the full state of the system. In addition, these calculations account for various constraints associated with the effectors e.g. actuators 114 and for performance and operation related limits associated with key engine parameters.

In the embodiments described, as an example, a multi-variable Constrained Model-Based Control (CMBC) architecture is employed in control system 100 for controlling the engine 20 and the actuators 114, the control scheme may be based on Model Predictive Control (MPC) or Model Inverting Control (MIC) techniques. These controls can be multiple-input multiple-output (MIMO) to account for interactions of the control loops, they can be model-based, and they can have limits or constraints built as an integral part of the control formulation and optimization to avoid designing controllers for each limit.

The controller 106 can include a memory system 110 to store instructions that are executed by one or more processors 112. The executable instructions may be stored or organized in any manner and at any level of abstraction, such as in connection with a controlling and/or monitoring operation of the sensor system 108 or actuators 114. The one or more processors 112 can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 110 may include random access memory (RAM), read only memory (ROM), or other electronic, optical, magnetic, or any other computer readable medium onto which is stored data and algorithms in a non-transitory form. The controller 106 can also interface with a communication bus 120 to send and receive data values and/or executable instructions. The controller 106 can include other interfaces (not depicted), such as various outputs, wireless communication interfaces, and the like.

Embodiments of the system 100 may include predictive models 200 for the engine 20, and 150 for the effectors or actuators 114 executable by one or more processors 112, where the predictive models 200, 150 include a plurality of component models 102, 104 configured to correspond with a modeled state of the mechanical system 100 and components thereof. For example, an engine model 102 and a model of an effector or actuator 104. Similarly, models for sensors and other components may also be employed. As further described herein, the predictive model 200, 150 can be used to generate prediction results regarding future states of the mechanical system 100, and in particular the engine 20, sensors 108 and actuators 114. The system 100 and controller 106 can capture sensor data from the sensor system 108 as observed history, which may also capture data snapshots surrounding operations, data trends, detected failures, abnormal conditions, and/or other targeted conditions. The observed history can be used real-time or offline to further refine the predictive model(s) 200, 150 and develop/improve operational and failure mode definitions.

Figure 3:
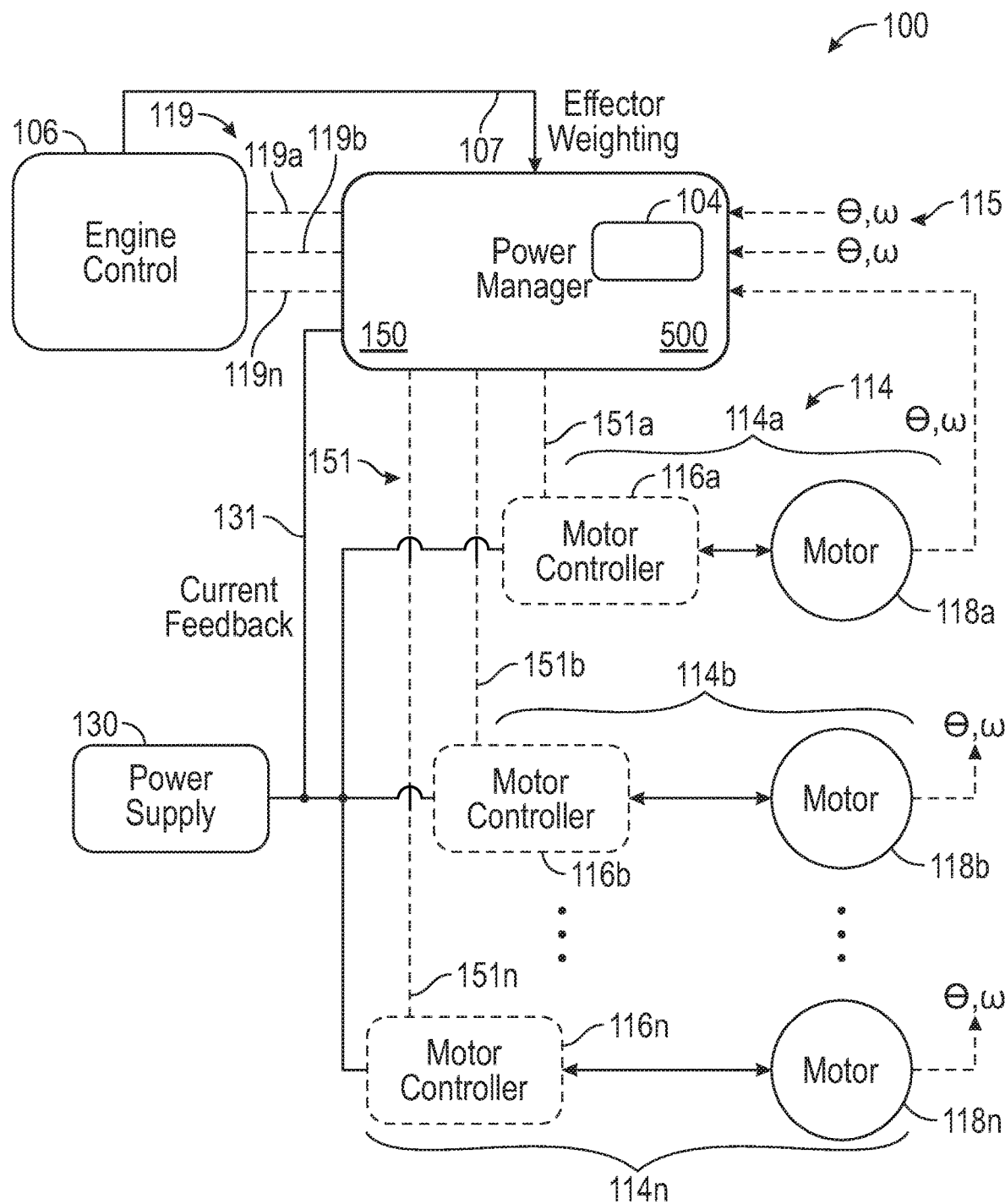
FIG. 3 illustrates a model based predictive monitoring system for a mechanical system according to an embodiment.

FIG. 3 depicts a simplified diagram of a portion of an engine control system 100 with model predictive control methodology 500 for sub-system power control in accordance with an embodiment. Conventionally, as described herein, engine controller 106 may be configured to provide commands to various effectors or actuator(s) shown generally here as 114 and more specifically as actuators 114a, 114b, . . . 114n. For example, actuators to control guide vanes, bleed valves, fuel nozzles and the like on the engine 20. The actuator 114 may be comprised of an electromechanical type actuators having, in some configurations, a motor controller, shown generally as 116 and specifically as motor controller(s) 116a, 116b, . . . 116n and a motor shown generally as 118 and specifically a 118a, 118b, . . . 118n. It should be appreciated that while depicted as a separate component, such depiction is for illustrative purposes only. In some embodiments, the motor controller 116 could be an integral component with engine controller 106 and/or integral with the motor 118. Conventionally, the engine controller 106 may provide motor command signals shown generally as 119 and more specifically as 119a, 119b, . . . 119n to the motor controller 116a, 116b, . . . 116n. The motor controller 116 may receive control commands 119 from the engine controller 106 as well as feedback signals from the motor 118 and provide control loop closure for the motor 118. Moreover, the motor commands 119 may be made directly to the motor 118 and directly commanding the motor 118 via the engine controller 106.

In an embodiment a power denoted 150 is interposed between the controller 106 an the actuators 114a, 114b, . . . 114n. In an embodiment, the engine controller 106 provides motor command signals shown generally as 119 as a demand to the power controller 150. The power controller 150 executes a methodology 500 to implement a model predictive control algorithm based on the demand signals 119 generates modified motor command signals shown generally as 151 and more specifically as 151a, 151b, . . . 151n, which are then directed to the respective the motor controller(s) 116a, 116b, . . . 116n. The motor controller(s) 116 may receive motor commands 151 from the power controller 150 as well as feedback signals from the motor 118 and provide control loop closure for the motor 118. Moreover, the motor commands 119, 151 may be made directly to the motor 118 directly commanding the motor 118 via the engine controller 106. The motor controller 116a, 116b, . . . 116n may also receive power from a power supply 130 and supply excitation power to the motor controller 116. It should be appreciated, that while in an embodiment, the feedback from the motor 118a, 118b, . . . 118n is depicted as being directed to the respective motor controller(s) 116a, 116b, . . . 116n, such depiction is merely illustrative. As depicted, the position and speed feedback 115 for each of the motors 118 could also be directed to the power manager 150. In addition the motor controllers 116a, 116b, . . . 116n could be integral with the power manager 150 including the control loops for controlling the motors 118a, 118b, . . . 118n.

Continuing with FIG. 3, in an embodiment a power manager 150 employing model based control methodology 500 may be employed to manage the power employed by the actuators 114. In an embodiment, a plurality of motor command signals 119a, 119b, . . . 119n for each of the actuators 114 e.g., 114a, 114b, . . . 114n from the engine controller 106 are routed to the power manager 150. In addition, a plurality of weighting factors 107 correlated to the sensitivities of the motor commands (e.g., 119) are provided by the engine controller 106 to the power manager 150. That is, under conventional control, the engine controller 106 may make one or more commands to the actuators 114 e.g., 114a, 114b, . . . 114n, where the commands are effectively uncoupled and each given the same weighting 107. As a result, each of the actuators 114 e.g., 114a, 114b, . . . 114n (and in particular, the motor controllers 116 e.g., 116a, 116b, . . . 116n are fully demanding power from the power supply 130 as needed to satisfy the individual motor commands e.g., 151a, 151b, . . . 151n for each respective actuator 114, e.g., 114a, 114b, . . . 114n. Conversely, in an embodiment, for example, under selected operating conditions, the engine control 106 may establish weighting factors 107 associated with one or more of the motor commands 119 e.g., 119a, 119b, . . . 119n. The weighting factors 107 permit the model based control algorithms of the power manager 150 to optimize and manage the current draw by the motor controllers 116a, 116b, . . . 116n on the power supply 130. In an embodiment, an operating mode of the engine 20 may alter the selected weighting(s) 107 corresponding to each of the effectors as needed. For example, primary effectors (e.g., actuators 114) may be given the highest weighting 107, while secondary systems and functions may be given lower weightings 107. For example, in normal operation, the highest weighting 107 may be given to variable vane systems, fuel management, and nozzle operation, while lower weighting 107 may be assigned to engine bleeds, and external air flow management. Conversely, under selected conditions for the engine 20, the weightings 107 may be modified. For example, under engine starting conditions; bleed valves and guide vanes may have high weighting 107 while nozzles to be lowered. Likewise, under low power engine acceleration; nozzle weighting 107 may be lowered in favor of increasing weighting 107 for guide vanes.

Further, under engine stall management conditions; bleed valves may be given the highest weighting 107, while under degraded operational conditions, guide vane weighting 107 may be lowered in favor of nozzles.

In an embodiment, the current drawn from the power supply 130 can be managed to within a selected threshold. In another embodiment, the current may be managed to limit the current draw for any given actuators 114 (e.g., 114a, 114b, 114n) to a selected level. The power manager 150 also receives one or more current feedback signals 131 corresponding to the current draw associated with each actuator 114 e.g., 114a, 114b, . . . 114n. In an embodiment, an average aggregate current provided by the power supply 130 is employed. The power manager 150 employs model predictive control techniques to formulate and adjust the motor commands 151, e.g., 151a, 151b, . . . 151n for each of the actuators 114 e.g., 114a, 114b, . . . 114n. Advantageously, the described approach permits a system designer to employ a selected rating power supply and conductors, rather than designing to the worst case cumulative power draw requirements associated with each actuators 114 e.g., 114a, 114b, . . . 114n.

Continuing with FIG. 3, because each actuator 114 is different operationally, deteriorates, degrades, experience faults, or be damaged in different ways, the model 104 should be able to track or adapt itself to follow such changes. The actuator model 104 should preferably reveal current information about how a particular actuator 114 is operating at a given time including the operation of its motor controller 116 and motor 118, and more particularly the current required for each from the power supply 130. This allows the future behavior of the actuator 114 to be more accurately predicted. Actuator parameters and states are two areas of the predictive model method 500 and/or actuator model 104 that can be modified to match the actuator model 104 to the actual actuator 114. In one embodiment, and particularly in more complex systems, a parameter estimator may be used to determine various actuator parameters, and a state estimator may be used to determine the states. A parameter estimator estimates and modifies parameters in the predictive model 150 and/or actuator model 104 to reduce the error between the sensors 108 and the models of sensors in the 104. This is called tracking the model to the actual component and, in particular, the actuator 114. A state estimator may be used to further aid in tracking the model 104 to the actuator 114. The state information may also be used to initialize the model-based predictive control method 500 at each time interval.

Using model based predictive control(s) methodology 500 allows the power manager 150 and therefore the engine control system 100 to use all the information provided by the actuator model 104, estimator, and diagnostic processes. The algorithm used herein allows the controller e.g. power manager 150 and/or engine controller 106 to see what the actuator 114 is going to do over time and at the same time know the actuator operating constraints. The engine control system 100 via the engine controller 106 or power manager 150 can then modify all of the control actions to ensure that none of the constraints are violated while satisfying a given control objective. In other word, the control ideally can develop an improved, if not the best possible, solution to meet the system requirements within the constraints presented.

MPC, in this instance, is based on the constrained open-loop optimization of a finite objective function. This optimization commences from an assumed known initial state and uses a dynamic system model to describe the evolution of the outputs. The objective function is a mathematical way of defining the goal of the control system. The objective function determines what is defined as optimal. Some general objective functions are to: minimize current consumption, maximize power, torque, and speed, maximize component life, minimize stress, minimize drag, follow reference current, speed, or torque commands, or minimize or maximize actuator command(s), minimize dollars, and/or minimize costs. The optimization algorithm used inside the control can be constrained or unconstrained, linear or nonlinear.

Figure 4:
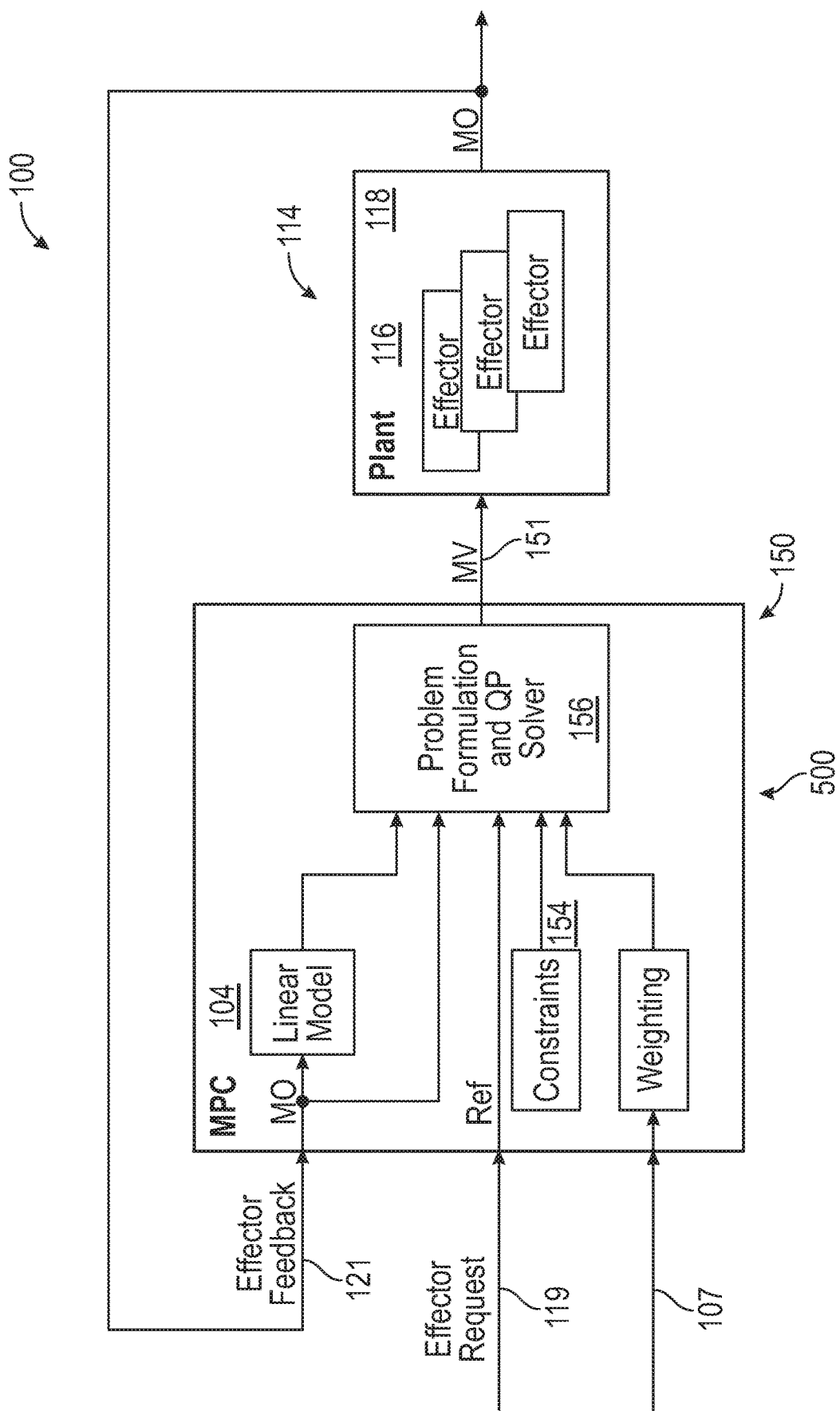
FIG. 4 illustrates block diagram of model based predictive control system for an effector according to an embodiment.

Turning now to FIG. 4 and continuing with FIG. 3 as well, for details of the engine control system 100 and method of model based predictive control 104 as employed with an effector (e.g., actuator 114) as part of the function of the power manager 150. The MPC function of the power manager 150 receives the effector request, which in this embodiment is the motor command(s) 119 for the various actuator(s) 114. As described earlier, the model based control method 500 of the power manager 150 also receives feedback 115, 131 either, directly from the motors 118, motor controller 116, and the power supply 130. The feedback 115, 131 is applied to a linear model 104 of the particular effector e.g., the actuators 114. The feedback and the output of the linear model 104 and then directed to the solver 156. It should be appreciated that while a linear model 104 is depicted, other types of models may be employed.

In an embodiment, the model predictive control of method 500 solves a quadratic programming optimization problem to determine an optimal command of the manipulated variables, in this instance, the motor command(s) 151 to the motor controller(s) 116 as a function of the power requirements for the actuators 114. In operation, the solver solution process is initiated with an initial "guess" as an established initial condition. The solver 156 iterates to the optimal solution within the constraints 154 of the engine control system 100. The method 500 allows for both hard and soft constraints to direct the solution. Hard constraints are constraints 154 that cannot be exceeded and may have to do with physical and dynamic limitations of the hardware, system, and the like. For example actuator strokes and rate limitations, power capabilities and the like. Likewise soft constraints are design limitations such as may be associated with the process constraints and limitations associated with the system or components. The model based predictive control method 500 also allows assignment of weighting (e.g., 107) when determining best solution. This approach facilitates, and forces tightened control of some effectors (e.g., actuators 114) within the plant at the expense of others.

Advantageously, the defined weighting 107 provided by the engine controller 106 provides guidance to the power manager 150 on which effectors (e.g., actuators 114) need accurate control for a given operating condition. The engine controller 106 and its logic determine engine mode of operation. In an embodiment, the operating mode of the engine 20 identifies which weighting 107 associated with a selected effector set (e.g., actuators 114a, 114b, . . . 114n) is to be employed. For example, in an embodiment a high relative weighting 107 indicates tight accuracy is required. Under such conditions, primary effectors (e.g., actuators) receive highest weighting 107, while secondary systems have lower weighting 107. For example, in one embodiment, highest weighting 107 is given to variable vane systems, fuel management, e.g., nozzles, while lowest weighting 107 is given to engine bleeds, external air flow management.

Figure 5:
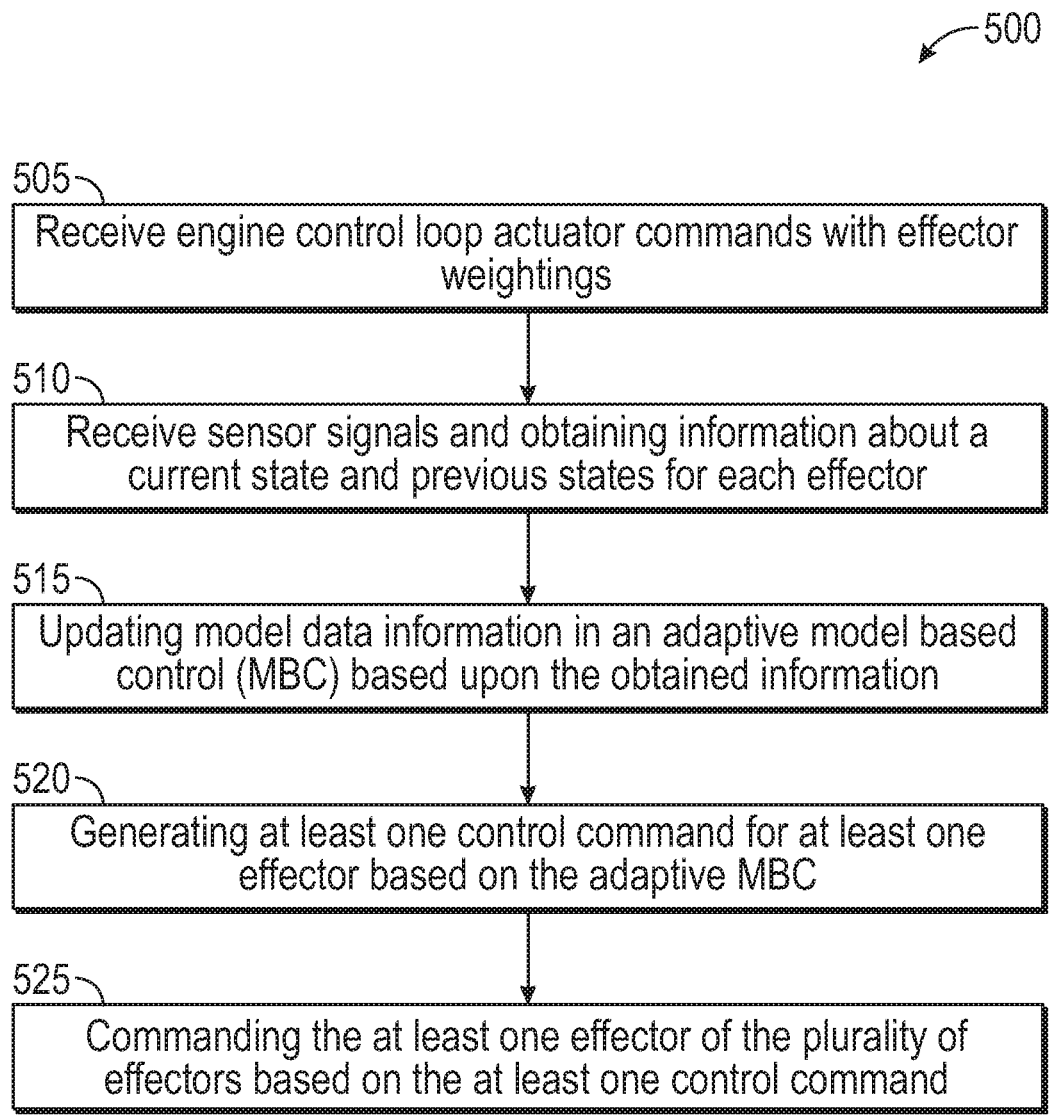
FIG. 5 illustrates a process of using a predictive system model according to an embodiment.

FIG. 5 depicts a flowchart of the methodology of model based predictive control for an effector or actuator 114 shown generally as 500. As may be executed by the engine controller 106 and/or power manager 150. Initially as shown at process step 505 the method receives the engine control loop actuator commands 119 with associated effector weightings 107. At process step 510, the sensor measurements from sensor 108 and actuator(s) 114 and information regarding the current state of the control system 100 are received for each effector (e.g., actuator 114) by the power manager 150. At process block 515, method 500 uses the specific information related to effectors, (e.g., actuator 114) current state including position speed, voltage, and current, power in order to adapt the MBC data and models to the new associated constraints 154. The described enhancements to the control system 100 operate to periodically update actuator status, health, and constraint information in the MBC of the control system 100. That is, the controller (e.g., 106) operates under selected conditions to update its actuator constraints (related to position, rate, and bandwidth, operation constraints, current draw and the like). Moreover, the control system 100 can now use the updated constraints, (e.g., range, rate of operation) and coordinate it with the other actuators (e.g., 114a, 114b, . . . 114m) to optimize the cumulative current loading on the power supply 130.

As depicted at process step 515, the MBC algorithms in the control system 100 may then adapt to a new configuration of employing the actuator 114 that is exhibiting new constraints 154. Adaptation in one instance may mean using new constraints information 154, with each new actuator command (e.g., 119a, 119b, 119n) while maintaining the same control architecture. Depending on the state information, constraints 154, and weightings 107, and the like, the objective or object function of the MBC can be changed as well to accommodate the command requirements for the actuators 114 to achieve desired engine performance and yet remain within the specifications of the power supply 130. Using model based control(s) allows the control system 100 to use more or all of the information provided by the system model, estimators, sensors 108, and diagnostic algorithms. Model based predictive control uses the model (e.g. 200, 150) and the current state information in the control to predict the future behavior of the effector (e.g. actuator 114). Because a prediction of the future behavior can be formed given an evolution of control inputs, many different control inputs can be tested to see which ones will track the desired references (e.g., speeds, positions, current draw, etc.), while still obeying any operating constraints 154 (e.g., limits on the actuators, maximum supply current, etc.). The algorithm used herein allows the controller 106 and/or power manager 150 to see what the actuator 114 is going to do over the future time horizon, and at the same time know the operating constraints for all the effectors/actuators 114. The control method 500 can then modify all of the control commands e.g., 151) to ensure that none of the constraints 154 are violated while optimally satisfying a given control objective (including the control commands for each actuator 114 from the engine controller 106 as depicted at process step 520. This means that the control can develop the best possible solution to meet the system requirements and avoid excessive current draw on the power supply 130. Finally, as depicted at process step 525 the effectors/actuators 114 are each commanded based on the adaptive MBC.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for controlling a plurality of electromechanical effectors of a gas turbine engine system, the method comprising:
receiving a request indicative of a desired state for each effector of the plurality of effectors;
receiving a weighting associated with each request;
obtaining information about a current state and at least one previous state of each effector of the plurality of effectors; wherein the current state includes at least one of an effector position and an effector current draw;
updating model data information in an adaptive model based control (MBC) based upon the obtained information;
generating at least one control command for at least one effector of the plurality of effectors based upon the adaptive model based control; and
commanding the at least one effector of the plurality of effectors based upon the generated at least one control command.

2. The method of claim 1, further including determining at least one of a constraint, an objective, an operational parameter or characteristic, a weighting, and an initial condition, for the adaptive model-based control system.

3. The method of claim 2, further including adapting the adaptive model based control system based on the at least one of the constraint, the objective, the initial condition, and the model characteristic.

4. The method of claim 3, wherein the adapting comprises modifying the model, constraints, and control parameters using information obtained about the current state of the effector.

5. The method of claim 1, wherein obtaining information about the current state and previous state of the effector comprises obtaining information about at least one of: an effector position, an effector speed, an effector current, a sensor, a sensing system, and a total current or power for the plurality of effectors.

6. The method of claim 1, wherein the generating step comprises identifying at least one reduced current requirement for the at least one effector of the plurality of effectors.

7. The method of claim 6, wherein a total current required for the plurality of effectors based on the at least one reduced current requirement is less than a selected threshold.

8. The method of claim 6, wherein the selected threshold is less than a cumulative current requirement for the plurality of effectors without the at least one reduced current requirement.

9. The method of claim 1, wherein the generating step comprises utilizing an quadratic programming optimizing method to determine the control command given the current state of the effector, the objective function, and the constraints and the weightings.

10. The method of claim 1, wherein the effector is an electromechanical actuator driven from a power supply, the power supply having a current rating lower than the cumulative current ratings of the effectors.

11. The method of claim 1, wherein the electromechanical actuator includes a motor and a motor controller.

12. An adaptable model-based control system for controlling a plurality of electromechanical effectors of gas turbine engine, the system comprising:
a plurality of sensors operably connected to measure a state or parameter of each effector of the plurality of effectors, the plurality of effectors operably connected to the engine to control a plurality of engine parameters;
a power supply configured to supply power to the plurality of effectors; and
a controller operably connected to the plurality of sensors, the plurality of effectors, and the power supply, the controller configured to execute a method for an adaptive model-based control for controlling each effector, the method comprising:
receiving a request indicative of a desired state for each effector of the plurality of effectors;
receiving a weighting associated with each request;
obtaining information about a current state and previous states of each effector of the plurality of effectors; wherein the current state includes at least one of an effector position and an effector current draw;
updating model data information in an adaptive model based control (MBC) based upon the obtained information;
generating at least one control command for at least one effector of the plurality of effectors based upon the adaptive model based control; and
commanding the at least one effector of the plurality of effectors based upon the generated at least one control command.

13. The system of claim 12, further including the controller determining at least one of a constraint, an objective, an operational parameter or characteristic, a weighting, and an initial condition, for the adaptive model-based control system.

14. The system of claim 12, further including the controller adapting the model based control system based on the at least one of the constraint, the objective, the initial condition, and the model characteristic, wherein the adapting comprises modifying the model, constraints, and control parameters using information obtained about the current state of the effector.

15. The system of claim 12, wherein the obtaining information about the current state and previous state of the effector comprises obtaining information about at least one of: an effector position, an effector speed, an effector current, a sensor, a sensing system, and a total current or total power for the plurality of effectors.

16. The system of claim 12, wherein the updating step comprises updating at least one of: a state, a variable, a parameter, a constraint, an objective function, and an initial condition.

17. The system of claim 12, wherein the generating step comprises identifying at least one reduced current requirement for the at least one effector of the plurality of effectors.

18. The system, of claim 17, wherein a total current required for the plurality of effectors based on the at least one reduced current requirement is less than a selected threshold.

19. The system of claim 17, wherein the selected threshold is less than a cumulative current requirement for the plurality of effectors without the at least one reduced current requirement.

20. The method of claim 12, wherein the generating step comprises utilizing an quadratic programming optimizing method to determine the control command given the current state of the effector, the objective function, and the constraints and the weightings.

21. The method of claim 12, wherein the effector is an electromechanical actuator driven from a power supply, the power supply having a current rating lower than the cumulative current ratings of the effectors.

22. The method of claim 21, where the electromechanical actuator includes a motor and a motor controller.

* * * * *